US012596459B2

(12) United States Patent
Ma et al.

(10) Patent No.: US 12,596,459 B2
(45) Date of Patent: Apr. 7, 2026

(54) TOUCH CONTROL SCREEN AND TOUCH CONTROL DEVICE

(71) Applicant: Wuhan China Star Optoelectronics Semiconductor Display Technology Co., Ltd., Wuhan (CN)

(72) Inventors: Yalong Ma, Wuhan (CN); Zengjian Jin, Wuhan (CN); Houfu Gong, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 84 days.

(21) Appl. No.: 17/610,705

(22) PCT Filed: Oct. 11, 2021

(86) PCT No.: PCT/CN2021/123001
§ 371 (c)(1),
(2) Date: Nov. 12, 2021

(87) PCT Pub. No.: WO2023/044975
PCT Pub. Date: Mar. 30, 2023

(65) Prior Publication Data
US 2024/0419284 A1 Dec. 19, 2024

(30) Foreign Application Priority Data
Sep. 27, 2021 (CN) .......................... 202111137668.7

(51) Int. Cl.
*G06F 3/044* (2006.01)
*G06F 3/0354* (2013.01)

(52) U.S. Cl.
CPC ........ *G06F 3/0446* (2019.05); *G06F 3/03545* (2013.01); *G06F 3/0447* (2019.05)

(58) Field of Classification Search
CPC .. G06F 3/0446; G06F 3/03545; G06F 3/0447; G06F 3/041; G06F 2203/04111; G06F 3/0443; G06F 3/0448
See application file for complete search history.

(56) References Cited

U.S. PATENT DOCUMENTS

| | | | | |
|---|---|---|---|---|
| 2014/0054156 A1* | 2/2014 | Chang | ................ | H03K 17/9622 |
| | | | | 200/600 |
| 2014/0118282 A1* | 5/2014 | Wen | ...................... | G06F 3/0443 |
| | | | | 345/173 |

(Continued)

FOREIGN PATENT DOCUMENTS

| | | |
|---|---|---|
| CN | 103631432 A | 3/2014 |
| CN | 108803945 A | 11/2018 |

(Continued)

OTHER PUBLICATIONS

International Search Report in International application No. PCT/CN2021/123001,mailed on Jun. 29, 2022.

(Continued)

*Primary Examiner* — Amy Onyekaba
(74) *Attorney, Agent, or Firm* — Nathan & Associates Patent Agents Ltd.; Menachem Nathan

(57) ABSTRACT

A touch control screen includes a plurality of sensing units having first sensing electrodes and second sensing electrodes. Each of the first sensing electrodes includes at least one first trunk channel extending along a first direction and a plurality of first branch electrodes electrically connected to the first trunk channel. Each of the second sensing electrodes includes at least one second trunk channel extending along a second direction and a plurality of second branch electrodes electrically connected to the second trunk channel. The second branch electrodes and the first branch electrodes (Continued)

are alternately arranged, so that a sensing signal change amount of the touch control screen tends to change linearly.

20 Claims, 7 Drawing Sheets

(56) References Cited

U.S. PATENT DOCUMENTS

| | | | | |
|---|---|---|---|---|
| 2014/0347299 | A1* | 11/2014 | Lu | G06F 3/0446 345/173 |
| 2015/0324027 | A1* | 11/2015 | Heo | G06F 3/0412 345/173 |
| 2018/0032155 | A1* | 2/2018 | Shirai | G06F 3/0383 |
| 2018/0223298 | A1* | 8/2018 | Heo | G06F 3/041 |
| 2020/0073514 | A1* | 3/2020 | Kuo | G06F 3/0412 |
| 2020/0201509 | A1* | 6/2020 | Kadowaki | G06F 3/0442 |
| 2020/0249794 | A1* | 8/2020 | Ullmann | G06F 3/0446 |

FOREIGN PATENT DOCUMENTS

| | | | | |
|---|---|---|---|---|
| CN | 109213369 | A | 1/2019 | |
| CN | 112445369 | A | 3/2021 | |
| CN | 112527159 | A * | 3/2021 | ............ G06F 3/044 |
| CN | 212723965 | U | 3/2021 | |
| CN | 112764580 | A | 5/2021 | |
| CN | 113126822 | A | 7/2021 | |

OTHER PUBLICATIONS

Written Opinion of the International Search Authority in International application No. PCT/CN2021/123001,mailed on Jun. 29, 2022.

Chinese Office Action issued in corresponding Chinese Patent Application No. 202111137668.7 dated Apr. 12, 2023, pp. 1-9.

* cited by examiner

TOUCH CONTROL SCREEN AND TOUCH CONTROL DEVICE

FIELD OF INVENTION

The present application is related to the field of display technology and specifically to a touch control screen and a touch control device.

BACKGROUND OF INVENTION

Currently, market's demands for touch control screens working with active styluses are becoming stronger and stronger. However, linearity effects of the current touch control screens working with the active styluses are not good.

A current sensing electrode pattern of a touch control screen is generally a rhombus pattern, and the rhombus pattern has a poor linearity performance. As shown in FIG. 1, a process of a nib moving from position A to position B and a process of the nib moving from position A' to position B', change trends of the nib and a signal amount of the sensing electrode in a first direction X (positively correlated with a coverage area) are inconsistent. This will cause differences in positions of reported points with same coordinates in the first direction X in different coordinate positions in a second direction Y. In a product debug process, it shows that an algorithm cannot correct linearities of the two positions at a same time, resulting in a linearity accuracy not meeting a required standard.

SUMMARY OF INVENTION

An embodiment of the present application provides a touch control screen and a touch control device to solve a technical problem of poor linearity accuracy of a current touch control screen working with an active stylus.

In order to solve the above problem, the present application provides technical solutions as follows.

A touch control screen provided by an embodiment of the present application includes:

a plurality of sensing units arranged along a first direction and a second direction, wherein the first direction and the second direction intersect. Each of the sensing units includes:

a first sensing electrode including at least one first trunk channel extending along the first direction and a plurality of first branch electrodes distributed on two sides of the first trunk channel, wherein the first branch electrodes are electrically connected to the first trunk channel; and a second sensing electrode insulated from the first sensing electrode including at least one second trunk channel extending along the second direction and a plurality of second branch electrodes distributed on two sides of the second trunk channel, wherein the second branch electrodes are electrically connected to the second trunk channel, and the second branch electrodes and the first branch electrodes are alternatively arranged.

In an embodiment of the present application, the first sensing electrode includes at least two first trunk channels electrically connected and parallel to each other, and/or the second sensing electrode includes at least two second trunk channels electrically connected and parallel to each other.

In an embodiment of the present application, the first branch electrodes and the second branch electrodes extend along the second direction, and the first branch electrodes and the second branch electrodes are alternatively arranged along the first direction.

In an embodiment of the present application, in the first branch electrodes and the second branch electrodes alternately arranged along the first direction, a number of the first branch electrodes is equal to a number of the second branch electrodes; in the first branch electrodes and the second branch electrodes alternately arranged along the first direction, a width of each of the first branch electrodes in the first direction is equal to a width of each of the second branch electrodes in the first direction; and in the first branch electrodes and the second branch electrodes alternately arranged along the first direction, a length of each of the first branch electrodes in the second direction is equal to a length of each of the second branch electrodes along the second direction.

In an embodiment of the present application, the first trunk channel and the second trunk channel cross each other, the second trunk channel includes at least two sub-channels and at least one first bridge electrode positioned on the two sides of the first trunk channel, the first bridge electrode electrically connects two adjacent sub-channels, and the first bridge electrode is positioned at an intersection of the first trunk channel and the second trunk channel.

In an embodiment of the present application, the first sensing electrode includes the at least two first trunk channels electrically connected and parallel to each other, the second sensing electrode includes the at least one second trunk channel, and the second trunk channel includes a first sub-channel positioned between two adjacent first trunk channels; and the first direction is a row direction, and in a same row, the first sub-channel and the second branch electrodes on two sides of the first sub-channel are electrically connected through a second bridge electrode.

In an embodiment of the present application, the second bridge electrode includes openings provided with second dummy electrodes insulated with the second bridge electrode.

In an embodiment of the present application, the second sensing electrode further includes a first edge electrode positioned in a first edge region of the sensing units and extending along the first direction, the second trunk channel includes a second sub-channel positioned in the first edge region, and the first edge electrode electrically connects a corresponding end of the second sub-channel and ends of the second branch electrodes on a same side.

In an embodiment of the present application, the first sensing electrode further includes a second edge electrode positioned in a second edge region of the sensing units and extending along the second direction, the edge electrode electrically is electrically connected to a corresponding end of the first trunk channel, and the second edge region is adjacent to the first edge region.

In an embodiment of the present application, adjacent second edge electrodes of the sensing units arranged along the first direction connect with each other, and adjacent first edge electrodes of the sensing units arranged along the second direction connect with each other.

In an embodiment of the present application, first dummy electrodes are provided between one of the first branch electrodes and adjacent one of the second branch electrodes, between the second trunk channel and adjacent one of the first branch electrodes, and between the second edge electrode and adjacent one of the second branch electrodes, and the first dummy electrodes extend along the second direction.

In an embodiment of the present application, the sub-channels, the second branch electrodes, the first trunk channel, and the first branch electrodes are disposed in a same layer, and the first bridge electrode and the sub-channels are disposed in different layers.

In an embodiment of the present application, each of the sensing units includes a first symmetry axis and a second symmetry axis crossing each other, the first symmetry axis is parallel to the first direction, and the second symmetry axis is parallel to the second direction.

In an embodiment of the present application, a shape of the first trunk channel, a shape of each of the first branch electrodes, a shape of the second trunk channel, and a shape of each of the second branch electrodes include strip shapes.

In an embodiment of the present application, the first trunk channel, each of the first branch electrodes, the second trunk channel, and each of the second branch electrodes include grid patterns.

In an embodiment of the present application, an edge of the second trunk channel extending along the second direction, an edge of each of the first branch electrodes extending along the second direction, an edge of each of the second branch electrodes extending along the second direction, and an edge of each of the first dummy electrodes extending along the second direction are jagged.

A touch control device further provided by an embodiment of the present application includes an active stylus and a touch control screen. The control screen includes:

a plurality of sensing units arranged along a first direction and a second direction. The first direction and the second direction intersect. Each of the sensing units includes:

a first sensing electrode including at least one first trunk channel extending along the first direction and a plurality of first branch electrodes distributed on two sides of the first trunk channel, wherein the first branch electrodes are electrically connected to the first trunk channel; and a second sensing electrode insulated from the first sensing electrode including at least one second trunk channel extending along the second direction and a plurality of second branch electrodes distributed on two sides of the second trunk channel, wherein the second branch electrodes are electrically connected to the second trunk channel, and the second branch electrodes and the first branch electrodes are alternatively arranged.

In an embodiment of the present application, the first sensing electrode includes at least two first trunk channels electrically connected and parallel to each other, and/or the second sensing electrode includes at least two second trunk channels electrically connected and parallel to each other.

In an embodiment of the present application, the first branch electrodes and the second branch electrodes extend along the second direction, and the first branch electrodes and the second branch electrodes are alternatively arranged along the first direction.

In an embodiment of the present application, in the first branch electrodes and the second branch electrodes alternately arranged along the first direction, a number of the first branch electrodes is equal to a number of the second branch electrodes;

in the first branch electrodes and the second branch electrodes alternately arranged along the first direction, a width of each of the first branch electrodes in the first direction is equal to a width of each of the second branch electrodes in the first direction; and in the first branch electrodes and the second branch electrodes alternately arranged along the first direction, a length of each of the first branch electrodes in the second direction is equal to a length of each of the second branch electrodes along the second direction.

The touch control screen provided by the present application includes the plurality of sensing units. Any one of the sensing units includes the first sensing electrode and the second sensing electrode insulated from each other. The first sensing electrode includes the at least one first trunk channel extending along the first direction and the plurality of first branch electrodes distributed on two sides of the first trunk channel and electrically connected to the first trunk channel. The second sensing electrode includes the at least one second trunk channel extending along the second direction and the plurality of second branch electrodes distributed on two sides of the second trunk channel and electrically connected to the second trunk channel. The second branch electrodes and the first branch electrodes are alternately arranged, so that a sensing signal change amount of the touch control screen in the first direction and the second direction tends to change linearly, which is beneficial to increase a linearity accuracy of the active stylus on the touch control screen.

DETAILED DESCRIPTION OF EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

In the descriptions of the present application, it should be understood that terms "first" and "second" are used for descriptive purposes only and cannot be understood as indicating or implying relative importance or implicitly indicating the number of technical features indicated. Therefore, the features defined as "first" and "second" may explicitly or implicitly include one or more of the features. In the description of the present application, the meaning of "multiple" is two or more, unless specifically defined otherwise.

Figure 2:
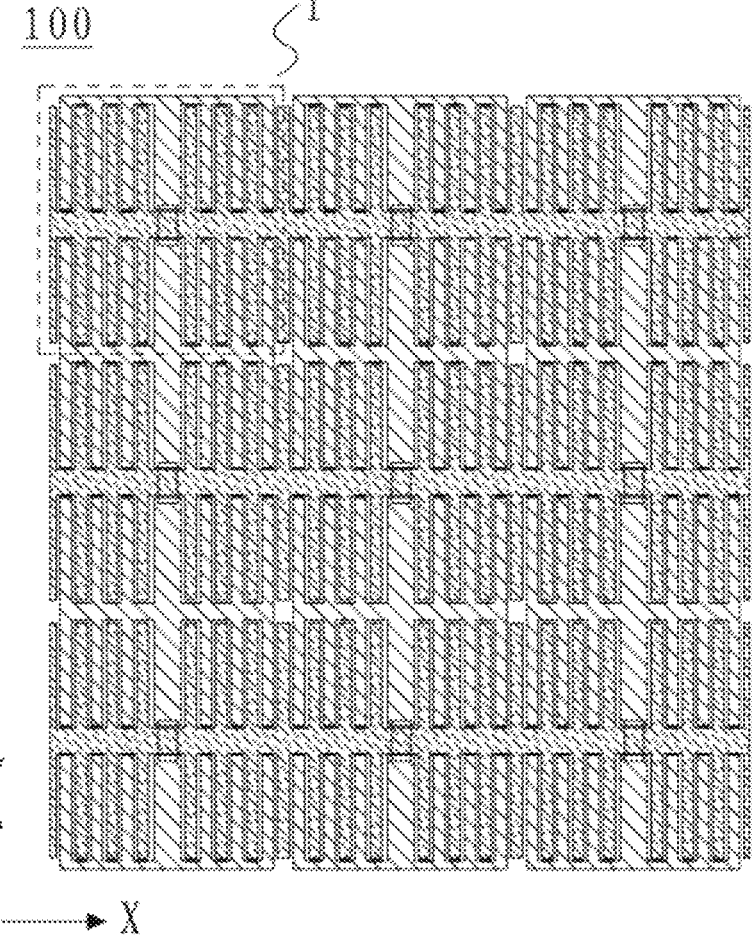
FIG. 2 is a schematic diagram of a plurality of sensing units provided by an embodiment of the present application.
Figure 3:
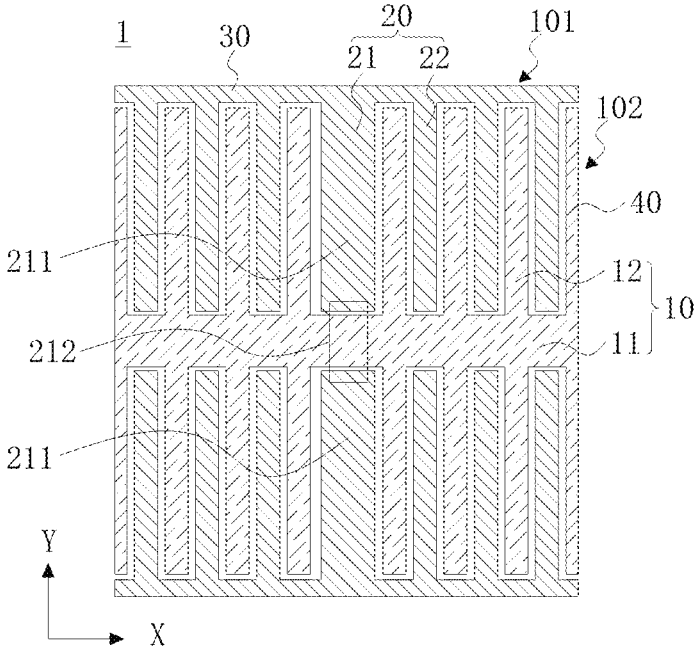
FIG. 3 is a structural schematic diagram of one first trunk channel and one second trunk channel crossing each other provided by an embodiment of the present application.

Please refer to FIGS. 2 and 3. FIG. 2 is a schematic diagram of a plurality of sensing units provided by an embodiment of the present application. FIG. 3 is a structural schematic diagram of one first trunk channel and one second trunk channel crossing each other provided by an embodiment of the present application. An embodiment of the present application provides a touch control screen 100. The touch control screen 100 can be used with an active stylus. The touch control screen 100 includes a plurality of sensing units 1 arranged along the first direction X and the second direction Y. The first direction X and the second direction Y intersect. The sensing units 1 arranged along the first direction X are electrically connected to each other. The sensing units 1 arranged along the second direction Y are electrically connected to each other. Any one of the sensing units 1 includes a first sensing electrode 10 and a second sensing electrode 20 insulated from each other. The active stylus has an ability to send out driving signals and has a transmitting circuit inside. When the active stylus approaches the touch control screen 100, the transmitting circuit sends a driving signal to cause the sensing electrode in the touch control screen 100 to produce a capacitance change, and a touch position of the active stylus can be calculated according to the capacitance change.

Figure 1:
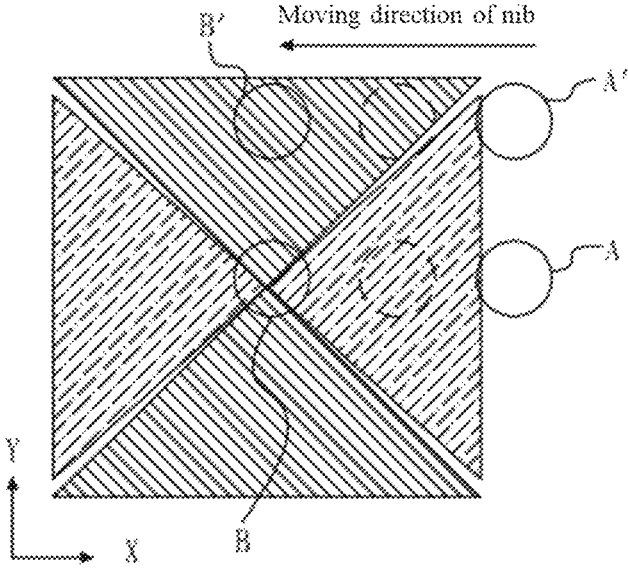
FIG. 1 is a schematic diagram of a sensing electrode in prior art.

Please refer to FIG. 1. FIG. 1 is a schematic diagram of a sensing electrode in prior art. A current sensing electrode is generally a rhombus pattern. During a process of a nib moving from position A to position B and a process of the nib moving from position A' to position B', change trends of the nib and a signal amount of the sensing electrode in a first direction X are inconsistent. This will cause differences in positions of reported points with same coordinates in the first direction X in different coordinate positions in a second direction Y, thereby leading to a technical problem of a poor linearity accuracy. In response to the above-mentioned defect, an embodiment of the present invention improves the first sensing electrode 10 and the second sensing electrode 20 to increase the linearity accuracy of the active stylus on the touch control screen 100.

Specifically, referring to FIG. 3, the first sensing electrode 10 includes at least one first trunk channel 11 extending along the first direction X and a plurality of first branch electrodes 12 distributed on two sides of the first trunk channel 11. The first branch electrodes 12 are electrically connected to the first trunk channel 11. The first branch electrodes 12 extend along the second direction Y. The second sensing electrode 20 includes at least one second trunk channel 21 extending along the second direction Y and a plurality of second branch electrodes 22 distributed on two sides of the second trunk channel 21. The second branch electrodes 22 are electrically connected to the second trunk channel 21. The second branch electrodes 22 extend along the second direction Y. The second branch electrodes 22 and the first branch electrodes 12 are alternately arranged in the first direction X. By extending the trunk channels and the branch electrodes of the first sensing electrode 10 and the second sensing electrode 20 along the first direction X or the second direction Y, the change trends of the signal amount in the first direction X and the second direction Y tends to change linearly, thereby relieving a problem of a poor touch linearity accuracy.

Preferably, in an embodiment of the present invention, the first direction X and the second direction Y are perpendicular to each other, so as to avoid a large area overlap between the first trunk channel 11 and the second trunk channel 21. In other words, the first trunk channel 11, the first branch electrodes 12, the second trunk channel 21, and the second branch electrodes 22 are all arranged horizontally or vertically. In this embodiment, the first direction X can be a horizontal direction, and the second direction Y can be a vertical direction. In another embodiment, the first direction X can be a vertical direction, and the second direction Y can be a horizontal direction. Furthermore, a shape of the first trunk channel 11, a shape of each of the first branch electrodes 12, a shape of the second trunk channel 21, and a shape of each of the second branch electrodes 22 include strip shapes, which can enable sensing signals in the first direction X and the second direction Y are vertical or horizontal signals. When the nib moves from any position to any direction, a change of the signal amount in the first direction X and the second direction Y can be ensured to tend to linear change, thereby further optimizing the touch linearity accuracy.

Referring to FIG. 2, in an embodiment of the present invention, the first trunk channel 11 of the sensing units 1 arranged along the first direction X are electrically connected to each other in sequence, and the second trunk channel 21 of the sensing units 1 arranged along the second direction Y are electrically connected to each other in sequence. Therefore, a signal channel connection in the first direction X and a signal channel connection in the second direction Y of the touch control screen are realized.

Referring to FIG. 3, the second sensing electrode 20 includes a first edge electrode 30 positioned in the first edge region 101 of the sensing units 1 and extending along the first direction X. The first edge electrode 30 electrically connects a corresponding end of the second trunk channel 21 and ends of the second branch electrodes 22 on a same side. Therefore, a signal channel connection between the second trunk channel 21 of the second sensing electrode 20 and the second branch electrodes 22 is realized.

The first sensing electrode 10 includes a second edge electrode 40 positioned in the second edge region 102 of the sensing units 1 and extending along the second direction Y. The second edge region 102 is adjacent to the first edge region 101. The second edge electrode 40 is electrically connected to a corresponding end of the first trunk channel 11. Therefore, a signal channel connection between the first trunk channel 11 and the first branch electrodes 12 of the first sensing electrode 10 is realized.

Referring to FIG. 3, the first trunk channel 11 and the second trunk channel 21 cross each other. The second trunk channel 21 includes at least two sub-channels 211 and at least one first bridge electrode 212 positioned on the two sides of the first trunk channel 11. The first bridge electrode 212 connects two adjacent sub-channels 211. The first bridge electrode 212 is correspondingly positioned at an intersection of the first trunk channel 11 and the second trunk channel 21.

It can be understood that the second trunk channel 21 is disconnected at the intersection, and the first bridge electrode 212 is configured to electrically connect the two sub-channels 211 where the second trunk channel 21 is disconnected. In addition, the first trunk channel 11 can be disconnected at the intersection to form at least two sub-channels, and then the bridge electrodes can be configured to electrically connect the sub-channels of the first trunk channel 11.

In an embodiment, the sub-channels 211, the second branch electrodes 22, the first trunk channel 11, and the first branch electrodes 12 can be disposed in a same layer, and the first bridge electrode 212 and the sub-channels 211 are disposed in different layers. Specifically, the touch control screen 100 further includes a first metal layer. The first metal layer includes the sub-channels 211, the first branch electrodes 12, the first trunk channel 11, and the second branch electrodes 22. Patterns of the sub-channels 211, the first branch electrodes 12, the first trunk channel 11, and the second branch electrodes 22 are formed by patterning the first metal layer. The touch control screen 100 further includes a second metal layer insulated from the first metal layer. An insulating layer is provided between the second metal layer and the first metal layer. The second metal layer includes the first bridge electrode 212. The insulating layer is defined with corresponding through holes. The first bridge electrode 212 penetrates through a corresponding one of the through holes to electrically connect the adjacent sub-channels 211.

In an embodiment of the present invention, the first metal layer further includes the first edge electrode 30 and the second edge electrode 40, which means that the first edge electrode 30 and the second edge electrode 40 are disposed in the same layer as the first trunk channel 11, the first branch electrodes 12, the sub-channels 211, and the second branch electrodes 22.

In an embodiment of the present invention, a number of the first trunk channels 11 and the second trunk channels 21 can be inconsistent, which can be configured to balance an inconsistent linearity problem caused by signal directions of the branch electrodes toward one direction.

Figure 4:
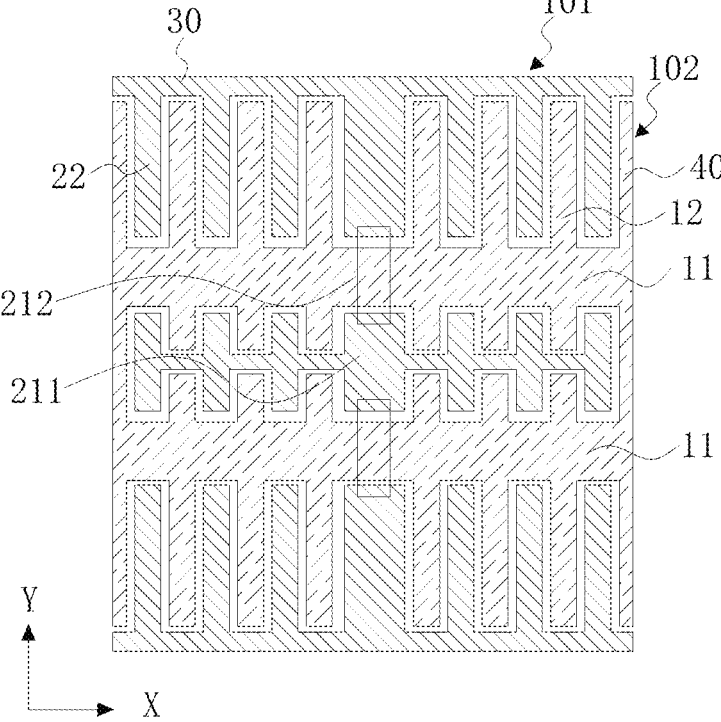
FIG. 4 is a structural schematic diagram of two first trunk channels and one second trunk channel crossing each other provided by an embodiment of the present application.
Figure 5:
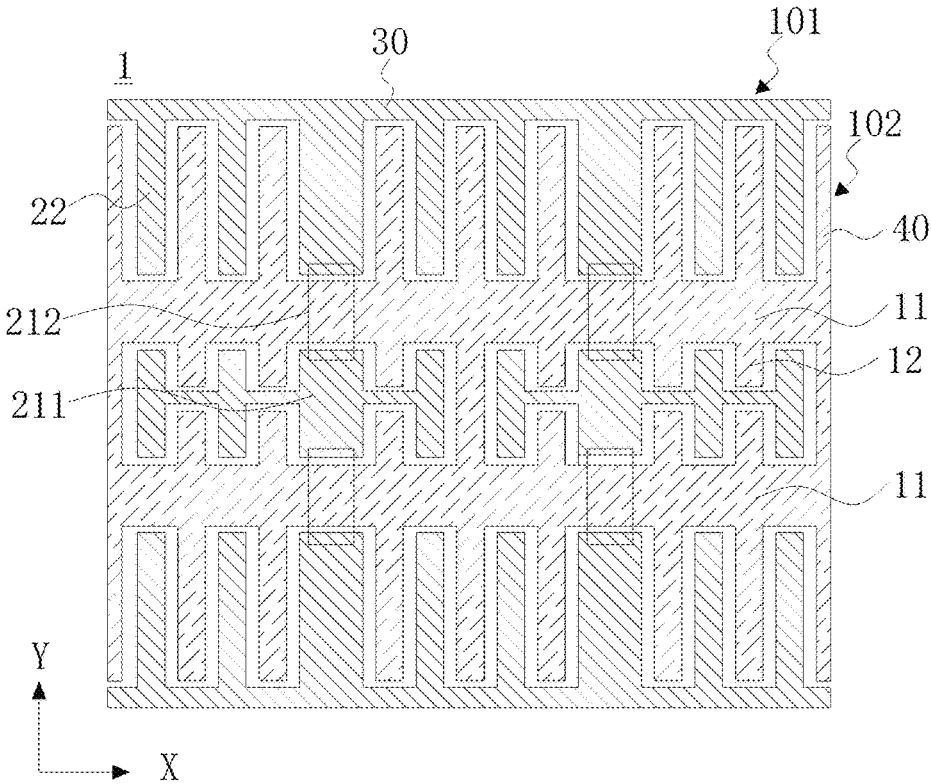
FIG. 5 is a structural schematic diagram of two first trunk channels and two second trunk channels crossing each other provided by an embodiment of the present application.

Please refer to FIGS. 4 and 5. FIG. 4 is a structural schematic diagram of two first trunk channels and one second trunk channel crossing each other provided by an embodiment of the present application. FIG. 5 is a structural schematic diagram of two first trunk channels and two second trunk channels crossing each other provided by an embodiment of the present application. Preferably, the first sensing electrode 10 includes at least two first trunk channels 11 electrically connected and parallel to each other, and/or, the second sensing electrode 20 includes at least two second trunk channels 21 electrically connected and parallel to each other. The greater a number of trunk channels (the first trunk channels 11 and the second trunk channels 21), the greater a number of the first branch electrodes 12 and the second branch electrodes 22. By adopting a multi-trunk channel design, the more the number of the trunk channels and the branch electrodes, the more obvious a linear change trend of the signal amount, and the more obvious an increasement of the linearity accuracy of the active stylus on the touch control screen.

Referring to FIGS. 4 and 5, in an embodiment of the present invention, the first sensing electrode 10 includes at least two first trunk channels 11 electrically connected and parallel to each other, and the second sensing electrode 20 includes at least one second trunk channel 21. The second trunk channel 21 includes a first sub-channel 2112 positioned between two adjacent first trunk channels 11. The first direction X is a row direction, and in a same row, the first sub-channel 2112 and the second branch electrodes 22 on two sides of the first sub-channel 2112 are electrically connected through a second bridge electrode 213.

Figure 8:
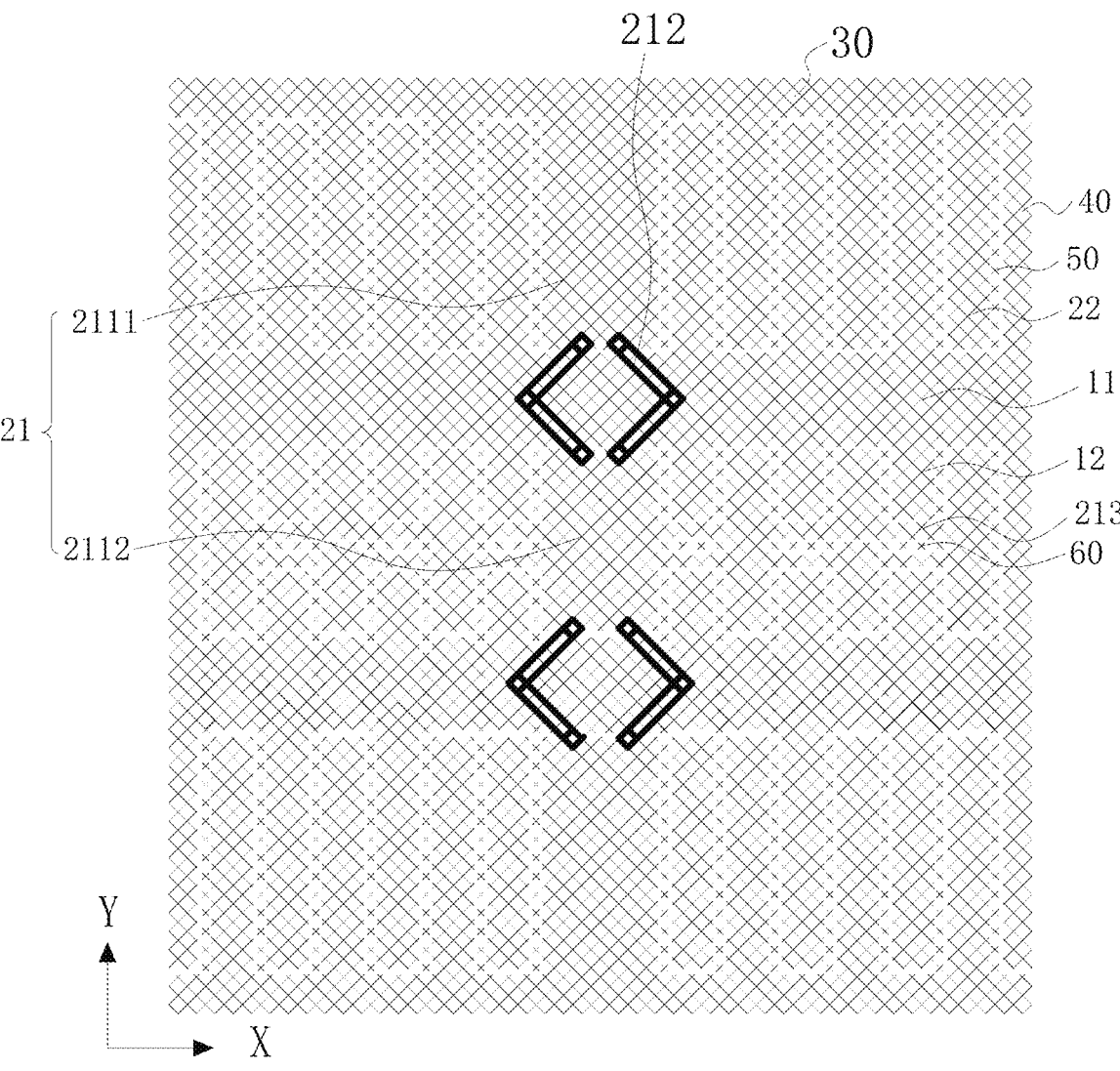
FIG. 8 is another structural schematic diagram of two first trunk channels and one second trunk channel crossing each other provided by an embodiment of the present application.

Referring to FIG. 8, the second trunk channel 21 further includes a second sub-channel 2111 positioned in the first edge region 101. The adjacent first sub-channel 2112 and the second sub-channel 2111 are electrically connected through the first bridge electrode 212. The first edge electrode 30 electrically connects a corresponding end of the second sub-channel 2111 and ends the second branch electrodes 22 on a same side.

Referring to FIG. 8, in an embodiment of the present invention, the second bridge electrode 213 includes openings. The openings are provided with second dummy electrodes 60. The second dummy electrodes 60 and the second bridge electrode 213 are insulated from each other. The second dummy electrodes 60 and the second bridge electrode 213 can be disposed in the same layer as the second branch electrodes 22, but it is necessary to ensure that the second dummy electrodes 60 and the second bridge electrode 213 are insulated from each other. By defining the openings in the second bridge electrode 213, an area of the branches of the second sensing electrode 20 can be reduced, and an impedance impact caused by the second bridge electrode 213 can be reduced. On a premise that an amount of sensing signals is sufficient, a reduction of a pattern area of the sensing electrode can also reduce a parasitic capacitance between the sensing units 1 and cathodes of the display panel.

With reference to FIGS. 2 and 8, in an embodiment of the present application, the second edge electrode 40 of adjacent sensing units 1 arranged along the first direction X are contact with each other, and the first edge electrode 30 of adjacent sensing units 1 arranged along the second direction Y are contact with each other. Therefore, the signal channel connection in the first direction X and the signal channel connection in the second direction Y of the touch control screen are realized.

Figure 6:
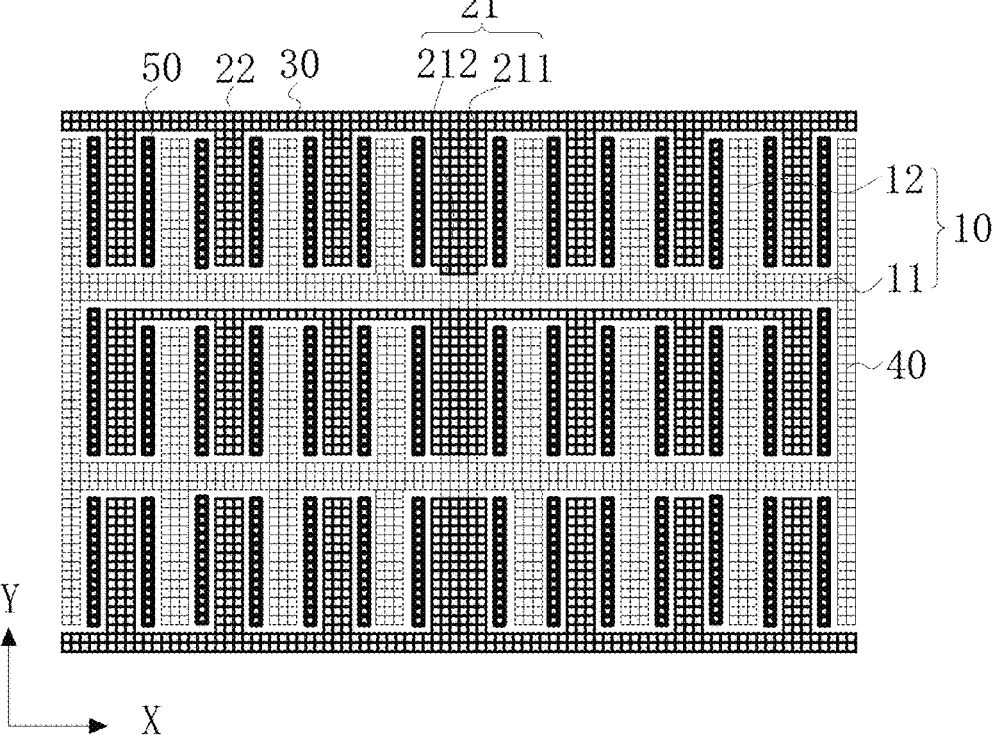
FIG. 6 is another structural schematic diagram of two first trunk channels and one second trunk channel crossing each other provided by an embodiment of the present application.

Please refer to FIG. 6. FIG. 6 is another structural schematic diagram of two first trunk channels and one second trunk channel crossing each other provided by an embodiment of the present application. In an embodiment of the present invention, the first trunk channel 11, the first branch electrodes 12, the second trunk channel 21, and the second branch electrodes 22 include grid patterns.

Because the first sensing electrode 10 needs to be insulated from the second sensing electrode 20, and the first trunk channel 11, the first branch electrodes 12, and the sub-channels 211 of the second trunk channel 21 and the second branch electrodes 22 are disposed in the same layer, there should be a certain distance between the first trunk channel 11, the first branch electrodes 12, the second trunk channel 21, and the second branch electrodes 22. In other words, there are gaps between the first trunk channel 11, the first branch electrodes 12, the second trunk channel 21, and the second branch electrodes 22.

In an embodiment of the present invention, the touch control screen 100 can be a touch display screen. A display panel can be provided under the sensing units 1 of the touch control screen 100 to realize a display function. The display panel can be a flexible display panel, and specifically can be a foldable display panel.

The touch control screen 100 further includes a plurality of first dummy electrodes 50. The first dummy electrodes 50 can be disposed between one of the first branch electrodes 12 and adjacent one of the second branch electrodes 22, between the second trunk channel 21 and adjacent one of the first branch electrodes 12, and between the second edge electrode 40 and adjacent one of the second branch electrodes 22. The first dummy electrodes 50 extend along the second direction Y, which means that the first dummy electrodes 50, the first branch electrodes 12, and the second branch electrodes 22 are arranged in parallel. It can be understood that the first dummy electrodes 50 are insulated from the first sensing electrode 10 and the second sensing electrode 20. Preferably, the first dummy electrodes 50 include a grid pattern.

In an embodiment of the present invention, the first metal layer further includes the first dummy electrodes 50, which means that the first dummy electrodes 50 are disposed in the same layer as the first trunk channel 11, the first branch electrodes 12, the sub-channels 211, and the second branch electrodes 22.

The first dummy electrodes 50 arranged in the gaps between the first trunk channel 11, the first branch electrodes 12, the second trunk channel 21, and the second branch electrodes 22 can keep metal grid lines uniformly distributed as much as possible. Therefore, the display pixel of the display panel under the sensing units 1 are ensured to be surrounded by the metal grid lines, so as to prevent an occurrence of display unevenness (mura).

Figure 7:
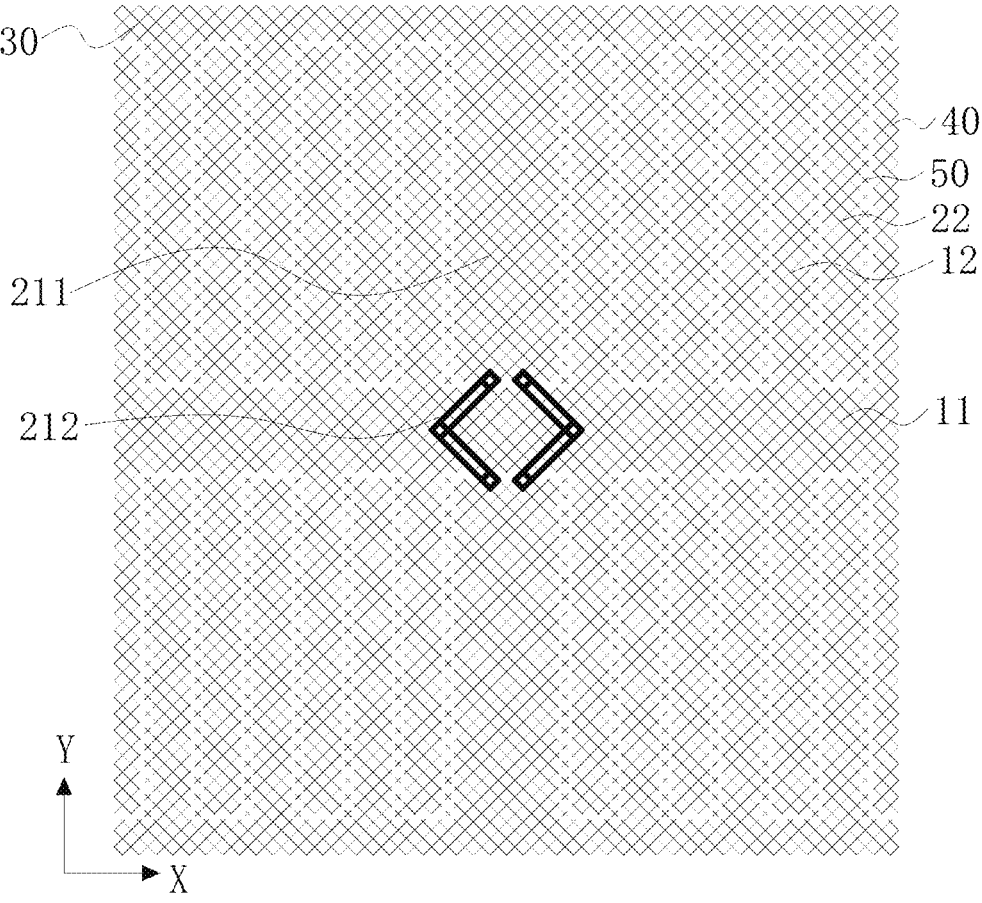
FIG. 7 is another structural schematic diagram of one first trunk channel and one second trunk channel crossing each other provided by an embodiment of the present application.

Please refer to FIGS. 7 and 8. FIG. 7 is another structural schematic diagram of one first trunk channel and one second trunk channel crossing each other provided by an embodiment of the present application. FIG. 8 is another structural schematic diagram of two first trunk channels and one second trunk channel crossing each other provided by an embodiment of the present application. The grid patterns of the first trunk channel 11, the first branch electrodes 12, the second trunk channel 21, and the second branch electrodes 22 can be rhombus grid patterns. Two center lines of each of the rhombus grid patterns are perpendicular to the first direction X and second direction Y, respectively.

Referring to FIGS. 6 to 8, the first bridge electrode 212 includes a grid pattern. The metal grid lines of the first bridge electrode 212 completely overlap with the metal grid lines of the first trunk channel 11 at corresponding intersections.

In the embodiment of the present invention, in the first branch electrodes 12 and the second branch electrodes 22 alternately arranged along the first direction X, a number of the first branch electrodes 12 is equal to a number of the second branch electrodes 22. In the first branch electrodes 12 and the second branch electrodes 22 alternately arranged along the first direction X, a width of the first branch electrodes 12 along the first direction X is equal to a width of the second branch electrodes 22 along the first direction X. In the first branch electrodes 12 and the second branch electrodes 22 alternately arranged along the first direction X, a length of the first branch electrodes 12 along the second direction Y is equal to a length of the second branch electrodes 22 along the second direction Y. By determining the widths, the lengths, and the numbers of the first branch electrodes 12 and the second branch electrodes 22 to be equal, the first branch electrodes 12 and the second branch electrodes 22 can be uniformly distributed in one of the sensing units 1. Therefore, sensing signals of the touch control screen 100 in the first direction X and the second direction Y can be kept as consistent as possible.

In an embodiment of the present invention, each of the sensing units 1 includes a first symmetry axis and a second symmetry axis crossing each other. The first symmetry axis is parallel to the first direction X, and the second symmetry axis is parallel to the second direction Y.

Figure 9:
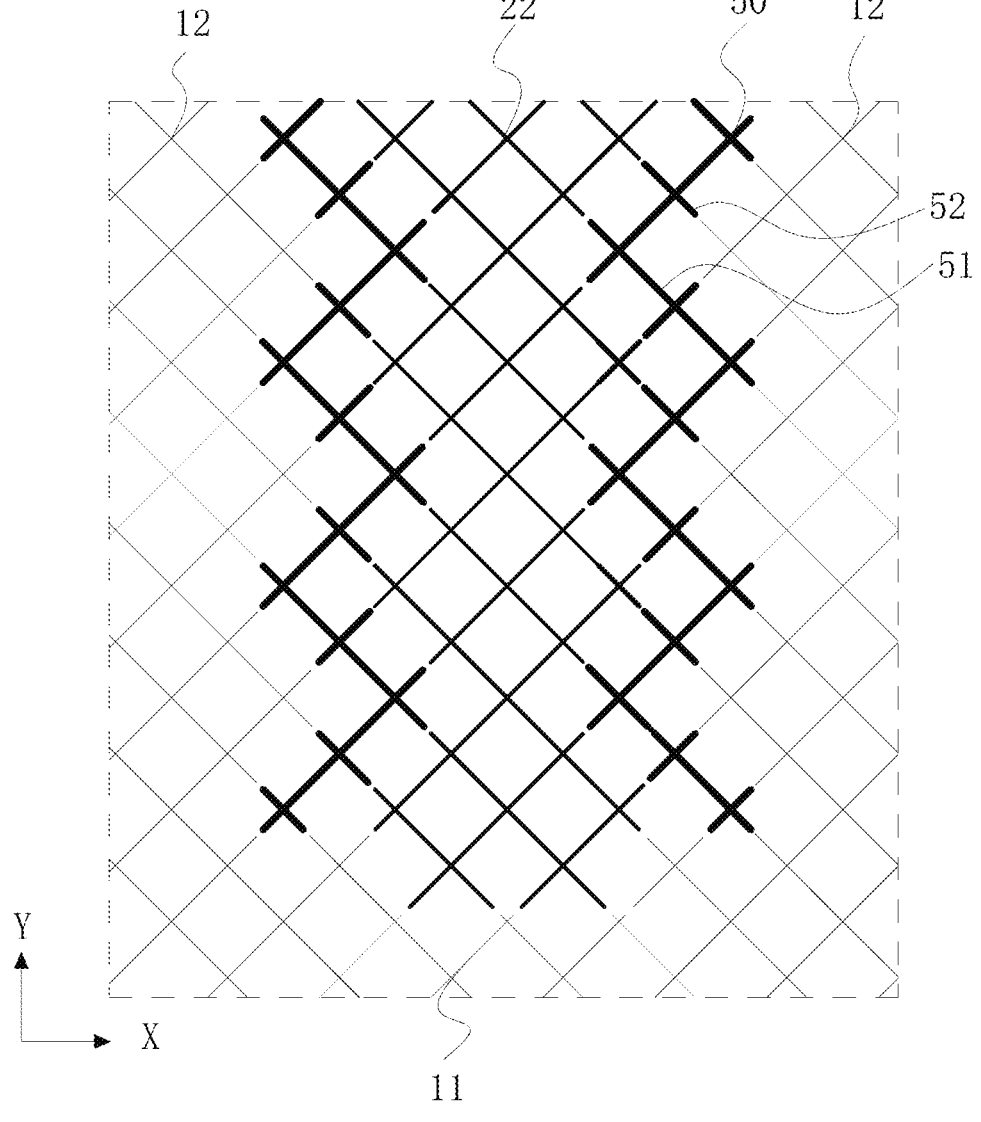
FIG. 9 is a partial enlarged schematic diagram of the sensing units provided by an embodiment of the present application.

Please refer to FIG. 9. FIG. 9 is a partial enlarged schematic diagram of the sensing units provided by an embodiment of the present application. In an embodiment of the present invention, an edge of the second trunk channel 21 extending along the second direction Y, an edge of each of the first branch electrodes 12 extending along the second direction Y, an edge of each of the second branch electrodes 22 extending along the second direction Y edge, and an edge of each of the first dummy electrodes 50 extending along the second direction Y are jagged.

A whole shape of each of the first dummy electrodes 50 is formed in a zigzag shape, such as a shape of the letter Z. Each of the first dummy electrodes 50 includes a long side 51 and a short side 52 intersecting each other. The sensing units 1 include rhombus grid patterns. The patterns of the first sensing electrode 10, the second sensing electrode 20, and the first dummy electrodes 50 are formed by breaking the metal grid lines of the rhombus grid patterns at corresponding positions. Preferably, the short side 52 disconnects two rhombus grids, and the long side 51 disconnects four rhombus grids.

The Z-shaped design can prevent the edges of the first branch electrodes 12, the second branch electrodes 22, and the second trunk channel 21 that are strip shapes from being connected in a straight line in the second direction Y to reduce visibility risks. However, jagged lines should not be too obvious. If the jagged lines are too obvious, it is not conducive to even position-reporting.

Figure 10:
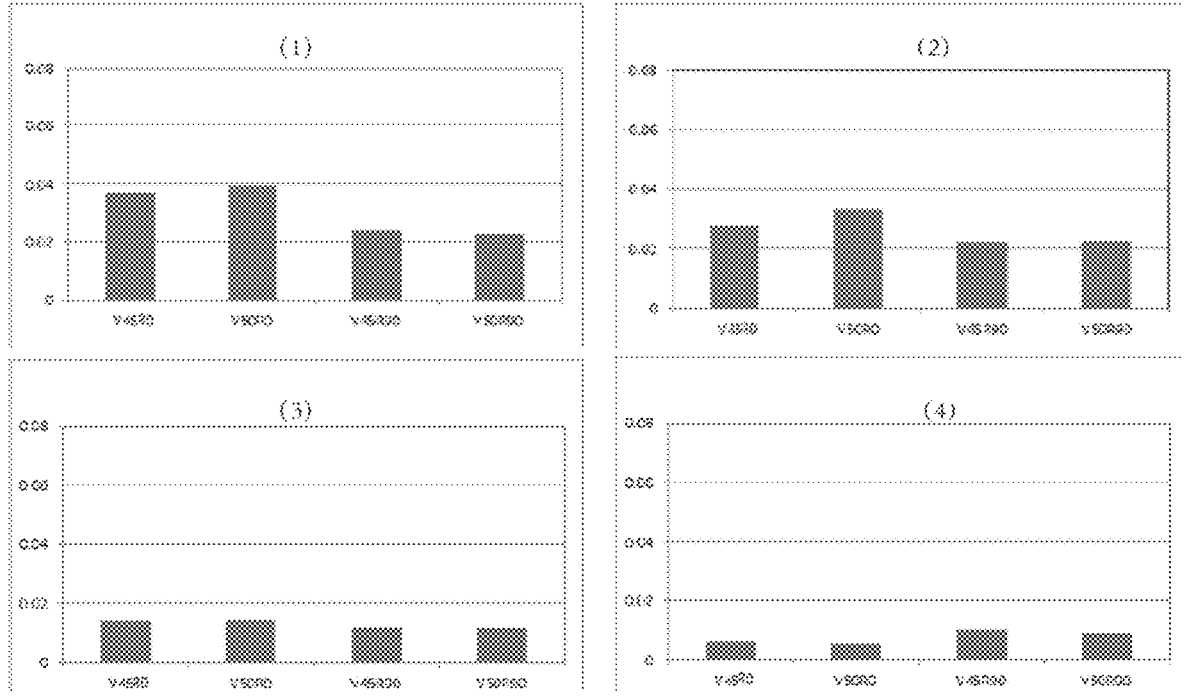
FIG. 10 is linearity simulation graphs of a touch control device provided by an embodiment of the present application and a touch control device in prior art.

An embodiment of the present invention further provides a touch control device, which includes an active stylus and the touch control screen 100 in the above embodiment. Please refer to FIG. 10. FIG. 10 is linearity simulation graphs of a touch control device provided by an embodiment of the present application and a touch control device in prior art. FIG. 10(1) is a linearity simulation graph of a sensing electrode pattern shown in FIG. 1. FIG. 10(2) is a linearity simulation graph of a sensing electrode pattern having one first trunk channel and one second trunk channel. FIG. 10(3) is a linearity simulation graph of a sensing electrode pattern having two first trunk channels and one second trunk channel. FIG. 10(4) is a linearity simulation graph of a sensing electrode pattern having two first trunk channels and two second trunk channels. Ordinates are linearity accuracy deviations. V45 and V50 respectively represent nib inclinations of 45 degrees and 50 degrees. R0 and R90 respectively represent lines drawn in the first direction X and the second direction Y. It can be seen from FIG. 10 that a linearity of the sensing electrode having multiple trunk channels provided by an embodiment of the present application has been significantly increased, especially linearity improvement effects of the multiple trunk channels such as 2×1 (FIG. 10(3)) trunk channels and 2×2 (FIG. 10(4)) is more obvious than linearity improvement effect of 1×1 (FIG. 10(2)) trunk channels.

The touch control screen provided by the present application includes the plurality of sensing units 1. Any one of the sensing units 1 includes the first sensing electrode 10 and the second sensing electrode 20 insulated from each other. The first sensing electrode 10 includes the at least one first trunk channel 11 extending along the first direction X and the plurality of first branch electrodes 12 distributed on two sides of the first trunk channel 11 and electrically connected to the first trunk channel 11. The second sensing electrode 20 includes the at least one second trunk channel 21 extending along the second direction Y and the plurality of second branch electrodes 22 distributed on two sides of the second trunk channel 21 and electrically connected to the second trunk channel 21. The second branch electrodes 22 and the first branch electrodes 12 are alternately arranged, so that a sensing signal change amount of the touch control screen 100 in the first direction X and the second direction Y tends to change linearly, which is beneficial to increase the linearity accuracy of the active stylus on the touch control screen 100.

In the above embodiments, the descriptions of the various embodiments are different in emphases, for contents not described in detail, please refer to related description of other embodiments.

The touch control screen and the touch control device provided by embodiments of the present application are described in detail above, and the description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A touch control screen, comprising: a plurality of sensing units arranged along a first direction and a second direction, wherein the first direction and the second direction intersect, and each of the sensing units comprises: a first sensing electrode comprising at least one first trunk channel extending along the first direction and a plurality of first branch electrodes distributed on two sides of the first trunk channel, wherein the first branch electrodes are electrically connected to the first trunk channel; a second sensing electrode insulated from the first sensing electrode comprising at least one second trunk channel extending along the second direction and a plurality of second branch electrodes distributed on two sides of the second trunk channel, wherein the second branch electrodes are electrically connected to the second trunk channel, and the second branch electrodes and the first branch electrodes are alternatively arranged, and first dummy electrodes arranged in gaps between the first trunk channel, the first branch electrodes, the second trunk channel, and the second branch electrodes; wherein each first dummy electrode of the first dummy electrodes is insulated from other ones of the first dummy electrodes in ones of the gaps different from the gap in which the first dummy electrode is arranged.

2. The touch control screen according to claim 1, wherein the first sensing electrode comprises at least two first trunk channels electrically connected and parallel to each other, and/or the second sensing electrode comprises at least two second trunk channels electrically connected and parallel to each other.

3. The touch control screen according to claim 2, wherein the first branch electrodes and the second branch electrodes extend along the second direction, and the first branch electrodes and the second branch electrodes are alternatively arranged along the first direction.

4. The touch control screen according to claim 3, wherein in the first branch electrodes and the second branch electrodes alternately arranged along the first direction, a number of the first branch electrodes is equal to a number of the second branch electrodes, a width of each of the first branch electrodes in the first direction is equal to a width of each of the second branch electrodes in the first direction, and a length of each of the first branch electrodes in the second direction is equal to a length of each of the second branch electrodes along the second direction.

5. The touch control screen according to claim 3, wherein the first trunk channel and the second trunk channel cross each other, the second trunk channel comprises at least two sub-channels and at least one first bridge electrode positioned on the two sides of the first trunk channel, the first bridge electrode electrically connects two adjacent sub-channels, and the first bridge electrode is positioned at an intersection of the first trunk channel and the second trunk channel.

6. The touch control screen according to claim 5, wherein the first sensing electrode comprises the at least two first trunk channels electrically connected and parallel to each other, the second sensing electrode comprises the at least one second trunk channel, and the second trunk channel comprises a first sub-channel positioned between two adjacent first trunk channels; and the first direction is a row direction, and in a same row, the first sub-channel and the second branch electrodes on two sides of the first sub-channel are electrically connected through a second bridge electrode.

7. The touch control screen according to claim 6, wherein the second bridge electrode comprises openings provided with second dummy electrodes insulated with the second bridge electrode.

8. The touch control screen according to claim 6, wherein the second sensing electrode further comprises a first edge electrode positioned in a first edge region of the sensing units and extending along the first direction, the second trunk channel comprises a second sub-channel positioned in the first edge region, and the first edge electrode electrically connects a corresponding end of the second sub-channel and ends of the second branch electrodes on a same side.

9. The touch control screen according to claim 8, wherein the first sensing electrode further comprises a second edge electrode positioned in a second edge region of the sensing units and extending along the second direction, the edge electrode electrically is electrically connected to a corresponding end of the first trunk channel, and the second edge region is adjacent to the first edge region.

10. The touch control screen according to claim 9, wherein the first dummy electrodes are provided between one of the first branch electrodes and adjacent one of the second branch electrodes, between the second trunk channel and adjacent one of the first branch electrodes, and between the second edge electrode and adjacent one of the second branch electrodes, and the first dummy electrodes extend along the second direction.

11. The touch control screen according to claim 9, wherein adjacent second edge electrodes of the sensing units arranged along the first direction connect with each other, and adjacent first edge electrodes of the sensing units arranged along the second direction connect with each other.

12. The touch control screen according to claim 5, wherein the sub-channels, the second branch electrodes, the first trunk channel, and the first branch electrodes are disposed in a same layer, and the first bridge electrode and the sub-channels are disposed in different layers.

13. The touch control screen according to claim 2, wherein each of the sensing units comprises a first symmetry axis and a second symmetry axis crossing each other, the first symmetry axis is parallel to the first direction, and the second symmetry axis is parallel to the second direction.

14. The touch control screen according to claim 2, wherein a shape of the first trunk channel, a shape of each of the first branch electrodes, a shape of the second trunk channel, and a shape of each of the second branch electrodes comprise strip shapes.

15. The touch control screen according to claim 14, wherein the first trunk channel, each of the first branch electrodes, the second trunk channel, and each of the second branch electrodes comprise grid patterns.

16. The touch control screen according to claim 15, wherein an edge of the second trunk channel extending along the second direction, an edge of each of the first branch electrodes extending along the second direction, an edge of each of the second branch electrodes extending along the second direction, and an edge of each of the first dummy electrodes extending along the second direction are jagged.

17. A touch control device, comprising an active stylus and a touch control screen, wherein the control screen comprises a plurality of sensing units arranged along a first direction and a second direction, and the first direction and the second direction intersect, and each of the sensing units comprises: a first sensing electrode comprising at least one first trunk channel extending along the first direction and a plurality of first branch electrodes distributed on two sides of the first trunk channel, wherein the first branch electrodes are electrically connected to the first trunk channel; a second sensing electrode insulated from the first sensing electrode comprising at least one second trunk channel extending along the second direction and a plurality of second branch electrodes distributed on two sides of the second trunk channel, wherein the second branch electrodes are electrically connected to the second trunk channel, and the second branch electrodes and the first branch electrodes are alternatively arranged, and first dummy electrodes arranged in gaps between the first trunk channel, the first branch electrodes, the second trunk channel, and the second branch electrodes; wherein each first dummy electrode of the first dummy electrodes is insulated from other ones of the first dummy electrodes in ones of the gaps different from the gap in which the first dummy electrode is arranged.

18. The touch control device according to claim 17, wherein the first sensing electrode comprises at least two first trunk channels electrically connected and parallel to each other, and/or the second sensing electrode comprises at least two second trunk channels electrically connected and parallel to each other.

19. The touch control device according to claim 18, wherein the first branch electrodes and the second branch electrodes extend along the second direction, and the first branch electrodes and the second branch electrodes are alternatively arranged along the first direction.

20. The touch control device according to claim 18, wherein in the first branch electrodes and the second branch electrodes alternately arranged along the first direction, a number of the first branch electrodes is equal to a number of the second branch electrodes, a width of each of the first branch electrodes in the first direction is equal to a width of each of the second branch electrodes in the first direction, and a length of each of the first branch electrodes in the second direction is equal to a length of each of the second branch electrodes along the second direction.

* * * * *